H. W. ALLINGHAM.
DRIVE CHAIN.
APPLICATION FILED APR. 3, 1911.
1,027,369.
Patented May 21, 1912.
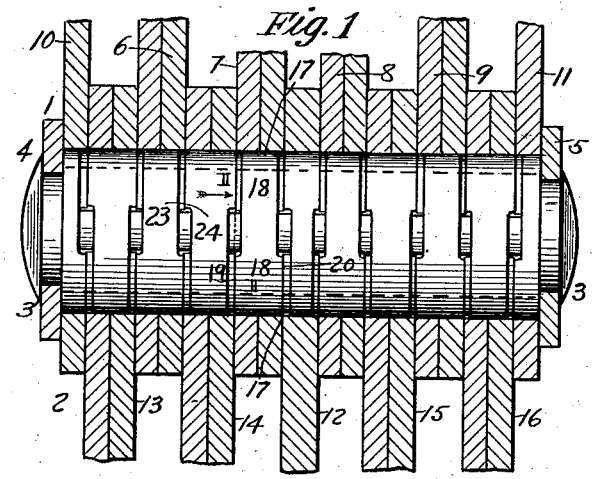
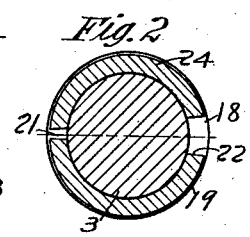
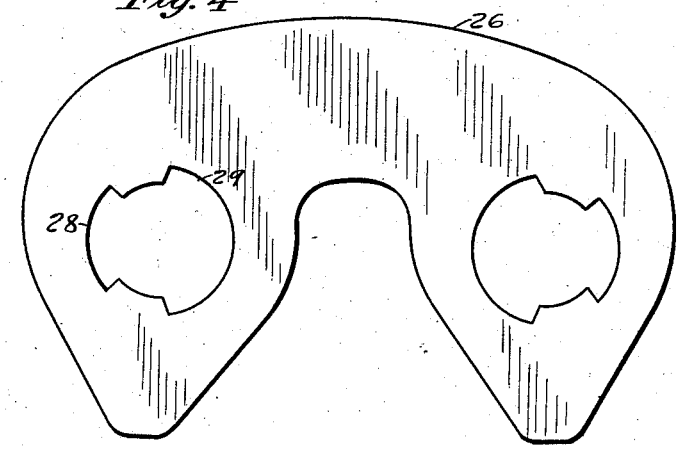
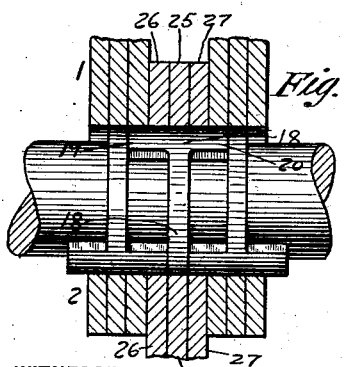
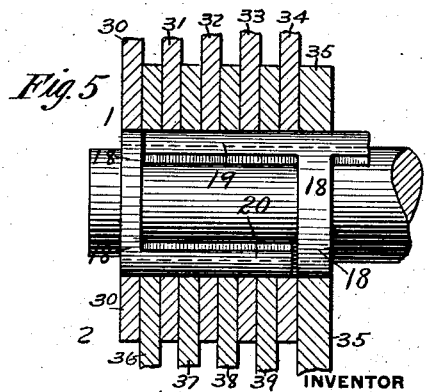
WITNESSES
INVENTOR
Henry W. Allingham
by Edward Wright
Att'y.

UNITED STATES PATENT OFFICE.

HENRY W. ALLINGHAM, OF LONDON, ENGLAND, ASSIGNOR TO THE MORSE CHAIN COMPANY, OF ITHACA, NEW YORK, A CORPORATION OF NEW YORK.

DRIVE-CHAIN.

1,027,369.        Specification of Letters Patent.        Patented May 21, 1912.

Application filed April 3, 1911. Serial No. 618,658.

*To all whom it may concern:*

Be it known that I, HENRY W. ALLINGHAM, a subject of the King of Great Britain, residing at London, England, have invented a certain new and useful Improvement in Drive-Chains, of which the following is a specification.

This invention relates to drive chains of the kind in which cylindrical pins are employed to connect the links, said pins being surrounded by bushes in order to decrease the wear on the links. In chains of this nature as heretofore constructed three arrangements of joint bushes have been employed, in the first of which a semi-circular bush is pressed into a correspondingly shaped recess in the hole in a link plate so as to engage with the cylindrical joint pin, the bush being of a length equal to the thickness of the plate or plates forming the link. In a second arrangement a complete circular bush is pressed into a circular hole in a link, the bush in this case also being of a length equal to the thickness of the plate or plates forming the link, and in a third arrangement a segmental bush is provided on each side of the joint pin, these segmental bushes extending throughout the full width of the chain. These segmental bushes will be tightly fitted in corresponding segmental recesses in alternate links across the width of the chain, but will pass loosely through the remaining links in a manner well understood.

In the first two of the arrangements above described it will be clearly recognized that the bearing surface between the bush and a joint pin is only half the total width of the chain. In the case of the third arrangement the bearing surface extends throughout the width of the chain, but it has been found that in service the segmental bushes become loosened in the link plates to which they are intended to be tightly fitted and their backs become worn by the pressure and slight movement of the links thereon. This is also the case with the semi-circular bushes employed in the first arrangement above described. With chains in which circular joint bushes are employed, wear on the backs of the bushes does not take place as the bushes can be secured very firmly to the link plates but, as pointed out above, with the circular bushes heretofore used or proposed the bearing surface between the bushes and joint pins only amounts to half the total width of the chain.

The object of the present invention is to provide an improved construction in which the advantage of circular bushes is combined with the additional advantage of a considerably increased bearing surface between the bushes and the joint pins.

In a drive chain constructed according to this invention the joint pin bush pertaining to a link member of the chain is so formed that one portion of the bush completely surrounds the joint pin and this portion is driven into, or otherwise secured in, a suitably shaped orifice provided in the link member through which the joint pin is intended to pass, while another portion projects, at one or both ends of the bush, beyond the first mentioned portion and only partly surrounds the pin. This projecting portion of the bush extends around the joint pin a certain distance which must in any case be less than one-half the circumference of the pin and is determined by the maximum amount of relative motion required to take place between two adjacent links during the flexure of the chain when in use. The bushes formed as stated above are arranged in the orifices in their respective link members in such a way that when a number of links are assembled to form a chain the shortest portion of one bush is adjacent to the longest or projecting portion of the next bush.

My invention may be carried out in various ways, examples of which are illustrated in the accompanying drawing, in which—

Figure 1 is a view of one joint of a drive chain of the arched link or silent type embodying my invention, the plates of which the links are composed, being shown in horizontal section; Fig. 2 is a transverse section of the pin and bushings taken on the line II—II of Fig. 1, and looking in the direction of the arrow; and Figs. 3, 4, and 5, are views illustrating modifications in the manner of carrying out the invention.

Referring to Fig. 1 of the drawing, one end of a link 1 is shown jointed to one end of a link 2 by means of a joint pin 3, the ends of the latter being riveted over outside washers 4 and 5 in a well known manner. As shown in Fig. 1 each of the inside link members 6, 7, 8, and 9 of link 1 consists of two plates, while the outside link members 10 and 11 consist of single plates. The central link member 12 of link 2 is shown as consisting of a single plate, while of the link members on each side of this, namely, 13, 14, and 15, 16, each consists of two plates. In this construction a separate bush is provided for each link member of the chain. As all the bushes for the inside link members are formed and secured in the corresponding orifices in the link plates in a substantially similar manner it will be sufficient to particularly describe one of these. Referring to link member 7 of link 1 a suitable orifice represented at 17, 17 is provided near the end of this link member having a shape and dimensions corresponding to the external form and dimensions of the bush 18. In the present instance the external form of this bush is shown as being circular and in practice the bush would usually have this form, but the invention is equally applicable to bushes having any other external form which it might be desired to employ. Into the orifice 17, 17 in the link member 7 is driven or otherwise secured the bush 18 which may be made of hardened steel or other suitable material. As will be seen from the drawing one portion of the bush along the line 18, 18 completely surrounds the joint pin 3 and this portion is fixed within the orifice 17, 17 in the link member 7, while the bush has other portions 19, 20 one on each face which project beyond the portion 18, 18 and only partially surround the joint pin, the bush 18 being arranged with its projecting portions 19, 20 on the working side of the orifice 17, 17 that is, on that side where power is transmitted from or to the joint pin to or from the link member 7 according to the direction of movement of the chain.

In order to form the bush 18, according to one method which I have found to be very simple and satisfactory in practice, I first cut from a steel tube having the requisite internal and external diameters a portion having a uniform length equal to the desired maximum length measured along the projecting portions 19, 20 of the finished bush. I then symmetrically cut away a portion from each end of the tube for a distance extending circumferentially around the tube which is determined in a manner to be explained hereinafter. The length of the portion thus cut away from each end of the tube is such that the shortened portion of the bush thus obtained is shorter than the width of the link member 7 by the same amount that the length of the original tube exceeded the said width. The outside edges of the projecting portions 19, 20 of the bush are preferably cut away or chamfered slightly as shown in Figs. 1 and 2 in order to prevent these edges from touching and wearing away the adjacent link plates as there is relative movement between these parts. In forming the bushes for the single outside link plates 10 and 11 a shorter length of tube may be provided and it is only necessary to cut away a portion from one end of the same as clearly appears from Fig. 1 of the drawing. The circumferential extent to which the end of a bush tube is to be cut away as above described is determined by the maximum amount of relative motion required to take place between two adjacent link members during the flexure of the chain when in use, but must in any case exceed one-half of the circumference of the tube for any flexure of the chain to be possible. Referring to Fig. 2 the portion cut away from the end of the bush tube 18 is shown as extending from the line 21 on the left around the upper part of the tube to the line 22 on the right, these lines 21 and 22 representing the circumferential limits of the projecting portion 19 of the bush 18 shown in Fig. 1. The upper shaded segment of an annulus shown in Fig. 2 is a sectional view of the projecting portion of the adjacent bush 23 which is secured in the member 14 of the link 2, this projecting portion corresponding in circumferential extent to the projecting portion 19 of the bush 18. From Fig. 2 it can be seen that a sufficient amount of metal has been cut away from the end of each bush tube to enable a maximum amount of relative motion to take place through an angle slightly exceeding 30°, between the two adjacent link members 7 and 14. Having fixed and arranged all the bushes in the several link members in the manner described above these are assembled upon the joint pin 3 to form links 1 and 2 of the chain, when the joint between these two links will appear as shown in Fig. 1. From this construction and arrangement of the parts it will be seen that the total width of the bearing surface between the joint pin and the bushes is the sum of the lengths of the longest portions of all the bushes arranged upon the pin, while owing to each bush having a portion completely surrounding the joint pin and firmly fixed in the corresponding link member, wear upon the backs of the bushes is reduced to a minimum.

In some cases where multi-plate links are employed the projecting portions of the bushes may fit tightly in correspondingly shaped orifices in some of the plates forming a link, while the circular portions of the bushes are tightly fitted in other plates of the link. Figs. 3 and 4 show an arrangement of this kind in which each link member consists of three plates; two of such link members of link 1 and one of link 2 are shown, together with one bush for each link member. The completely circular portion 18, 18 of the central bush of the three illustrated is fixed in a circular hole of corresponding size in the central plate 25 of link 2, while the projecting segmental portions 19, 20 of this bush are tightly held in correspondingly shaped orifices or recesses in the plates 26, 27, of link 2. A side view of plate 26 is shown in Fig. 4 in which the recess 28 is shown as adapted to tightly hold the projecting segmental portion 19 of the bush while the large recess 29 is provided in order to allow free movement therein to the similarly projecting segmental portion of the adjacent bush during the flexure of the chain joint.

Fig. 5 illustrates one-half of the two links 1 and 2 of a chain embodying another modification of my invention. In this arrangement each member of a link consists of a single plate and only three bushes are required for one joint pin. The completely circular portion 18, 18 of one end bush is driven tightly into a circular hole in the outside plate 30 of link 1 and the inwardly projecting segmental portion 20 of this bush is tightly held in correspondingly shaped segmental recesses formed in the plates 31, 32, 33, 34 of link 1. The completely circular portion 18, 18 of the central bush is tightly held in a circular hole in the central plate 35 of link 2, while the projecting segmental portion 19 is held in correspondingly shaped segmental recesses formed in the plates 36, 37, 38, 39 of link 2. It will of course be understood that large recesses similar to that indicated at 29 in Fig. 4 are also provided in each of the plates 31 to 34 and 36 to 39 in this construction, in order to permit of the flexure of the chain joint. The other halves of the links (not illustrated) would be formed in a precisely similar manner.

It will be clear from the above description that in all cases the bearing surface between a joint pin and the link bushes is much increased by the use of my improved construction, and in some instances this bearing surface may be made to extend to nearly the full width of the chain.

Having now described my invention, what I claim as new, and desire to secure by Letters Patent, is:

1. A joint for drive chains comprising link members, a joint pin, and a bushing completely surrounding the pin at one point and rigidly secured in the aperture of a link member, said bushing being provided with a lateral projection upon one side of the pin for extending the bearing surface.

2. A joint for drive chains comprising link members, a point pin, and a plurality of bushings, each completely surrounding the joint pin, some of the bushings being rigidly secured in the aperture of the link members of one link and provided with lateral projections on one side of the pin, and others secured in the apertures of the link members of the other link and provided with lateral projections on the opposite side of the pin.

3. In a drive chain, the combination with adjacent links, each formed of a plurality of plates having apertures at their ends, of a joint pin, and a bushing in one of said apertures completely surrounding said pin and provided with a lateral projection extending through apertures in other plates.

4. In a drive chain, the combination with adjacent links having apertures, of a joint pin, and a bushing having a cylindrical portion rigidly secured in the aperture of one of the link members and provided with a lateral projection upon one side of the pin.

5. In a drive chain, the combination with adjacent links having apertures, of a joint pin, and a bushing having a cylindrical portion inserted in one of said apertures and lateral projections upon opposite sides of the cylindrical portion.

6. In a drive chain, the combination with adjacent links each formed of a plurality of plates having apertures at their ends, of a joint pin, and cylindrical bushings inserted in the apertures of some of the plates and provided with lateral projections extending through the apertures of other plates along the surface of the pin.

7. In a drive chain, the combination with adjacent links each formed of a plurality of plates having apertures at their ends, of a joint pin, and cylindrical bushings inserted in the apertures of some of the plates and provided with lateral projections, the apertures of some of the plates of both links being formed to hold the lateral projections on one side and permit free movement of the lateral projections on the other side.

HENRY W. ALLINGHAM.

Witnesses:
 R. O. LEEFITTE,
 A. A. BERGIN.

Copies of this patent may be obtained for five cents each, by addressing the "Commissioner of Patents, Washington, D. C."